March 18, 1958 F. W. KELLEY, JR., ET AL 2,827,606
MAGNETIC AMPLIFIER
Filed Oct. 23, 1956
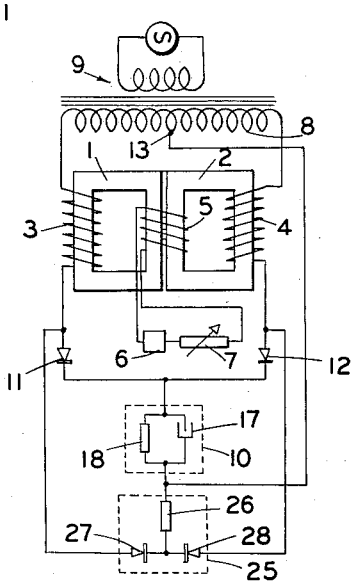
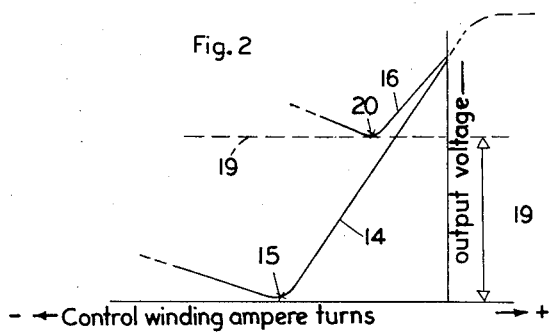
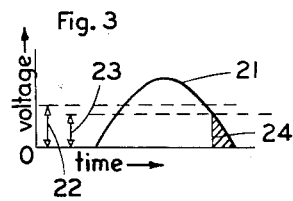
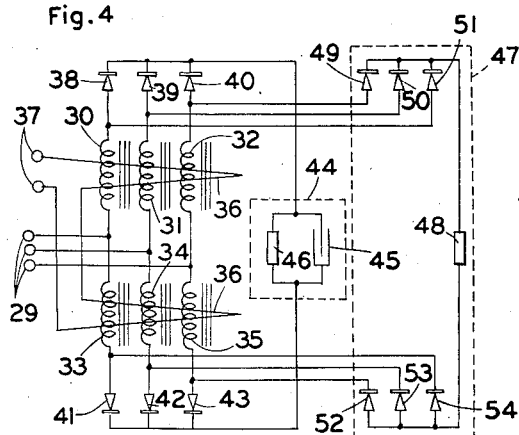
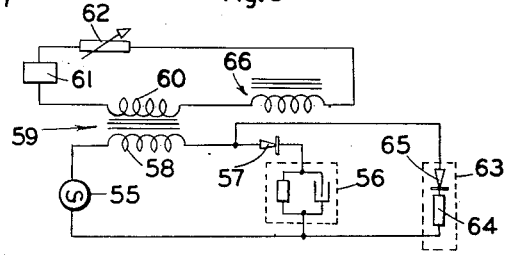
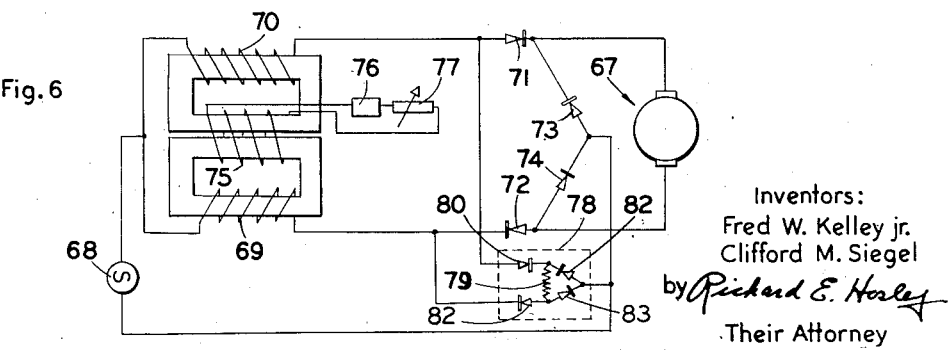
Inventors:
Fred W. Kelley jr.
Clifford M. Siegel
by Richard E. Horley
Their Attorney United States Patent Office 2,827,606
Patented Mar. 18, 1958

2,827,606

MAGNETIC AMPLIFIER

Fred W. Kelley, Jr., Melrose, Mass., and Clifford M. Siegel, Charlottesville, Va., assignors to General Electric Company, a corporation of New York Application October 23, 1956, Serial No. 617,740

5 Claims. (Cl. 318—513)

The present invention relates to improvements in saturable reactance apparatus, and, more particularly, to arrangements wherein improved stability and control are achieved in magnetic amplifiers energizing loads in which counter electromotive forces are produced.

Saturable reactance devices of the type including A.-C. output windings and D.-C. saturating or control windings disposed about saturable magnetic core members have found widespread application in supplementing or replacing electronic amplifiers and rotating regulators, especially where they are brought into certain high-gain circuit relationships with rectifiers. Apparatus of this high-gain construction has commonly been identified by the term "amplistat." While these devices operate satisfactorily with resistive loads or with loads having relatively small time constants, as compared with the time constants of their control signal circuits, they have been found to malfunction where the loads produce large counter electromotive forces. Typical of counter-E. M. F. loads occasioning this difficulty are those in which there are large capacitors, or motor loads developing large internal signals, as in the case of a D.-C. shunt motor armature. In systems of this type, the control signal circuit is often unable to provide a satisfactory control over a desired wide range of operating conditions, this defect being evidenced by system instability, oscillations, abnormally slow responses, and nonlinearities in the output vs. input characteristics.

Accordingly, it is one of the objects of the present invention to provide magnetic amplifier circuitry possessing improved stability and speed of response in association with loads developing large counter electromotive forces.

Further, it is an object to provide improved magnetic amplifier systems wherein a special auxiliary load circuit operates to correct malfunctioning with counter-E. M. F. loads without consuming significant quantities of power and without introducing undesired high impedances into the circuitry.

By way of a summary account of this invention in one of its aspects, we provide an amplistat of the usual construction including a pair of gate windings and at least one D.-C. control signal winding associated with saturable magnetic core material. Each of the gate windings is serially coupled with a different dry rectifier and, in turn, with a principal counter-E. M. F. load and a source of alternating current excitation, the rectifiers being polarized such that the gate windings tend to conduct only different half-cycles of the A.-C. excitation. The principal load in one instance comprises elements having a large capacitance, paralleled with resistance. An auxiliary load of a resistive nature, and having a value about twenty times that of the principal load resistance, is also interposed in the system, this auxiliary load resistance being fed at one end by a pair of appropriately-polarized rectifiers connected one each to the gate windings and being coupled to the A.-C. source at its other end. The auxiliary load circuit, including its rectifiers, is thus paralleled with the principal load circuit, including the rectifiers coupled to the latter. It is essential that the auxiliary load resistance and A.-C. source voltage be proportioned such that the source voltage exceeds the product of the auxiliary load resistance and the gate circuit exciting current component. The gate circuit exciting current component in any magnetic amplifier is the current flowing through the gate (i. e. load) windings when the associated core material is unsaturated, and is determined by the winding parameters, such as number of turns, wire dimensions, and the like, and by the magnetic and physical characteristics of the associated magnetic core material.

The novel features which are believed to be characteristic of this invention are set forth with particularity in the appended claims. This invention, however, both as to its organization and method of operation, together with further objects and advantages thereof, may best be understood by reference to the following description taken in connection with the accompanying drawing, in which:

Figure 1 illustrates schematically a single-phase center-tap magnetic amplifier system embodying the present teachings;

Figure 2 graphically portrays operating characteristics with and without practice of this invention;

Figure 3 is a plot of signals representative of those appearing in a magnetic amplifier delivering power to a load developing a large counter-E. M. F.

Figure 4 is a schematic diagram of an improved three-phase amplistat incorporating the auxiliary load circuit of this invention;

Figure 5 is a schematic diagram of an improved half-wave amplistat system; and

Figure 6 is a schematic portrayal of a single-phase bridge amplistat wherein malfunctioning is prevented while excitation is delivered to a D.-C. shunt motor armature.

The single-phase center-tap circuitry of Figure 1 includes the conventional closed core reactor members 1 and 2 about which appear gate or load windings 3 and 4, respectively, as well as a common control signal winding 5 which is energized by a D.-C. source 6 which may cooperate with a series variable control impedance 7. Each of gate windings 3 and 4 is connected with a different end of the center-tapped secondary 8 of an A.-C. supply transformer 9, and each is also coupled with a primary load 10 through a different dry current rectifier 11 and 12, respectively, the load 10 being returned to the transformer center tap 13.

Were load 10 of a wholly resistive nature, the plot of output or load voltage vs. control winding ampere-turns would be essentially that of curve 14, in Figure 2. This characteristic is obtained for an amplifier having a given A.-C. input voltage, with the output voltages being plotted as the ordinate and the control winding ampere-turns as the abscissa. With zero D.-C. signal applied to the control winding 5, the amplifier output is near a maximum value, and as the control current is increased negatively, the output diminshes to a minimum at a point 15 representative of a certain negative current. A relatively wide range of control currents is thus found to exercise precise control over the output to the load. When the load develops a large counter-E. M. F., however, the curve of amplifier characteristics is influenced by this counter-E. M. F. and becomes similar to that identified by reference character 16. Such a load is in fact depicted by the large capacitance 17 in parallel with resistance 18, in Figure 1. Voltage level 19 in Figure 2 represents the counter-E. M. F. built up across this capactive load 10 under-certain conditions, and it will be observed that the control winding ampere-turns (which are related to control winding current in a given reactor) not only yield outputs which are different from those obtained with a resistive load but exercise control only over a narrower range, as witnessed by the position of minimum output point 20 on curve 16. Increasing the control current more negatively, to increase the negative ampere-turns beyond the values represented at point 20 then yields output voltages equal to those obtained at less negative values, and the system operation is unpredictable. This is further complicated by the appearance of a whole family of curves, such as curve 16, the plots of which depend upon the counter-E. M. F.'s which happen to appear across the load, and it will thus be appreciated that the amplifier operations would be unpredictable to an intolerable extent.

A further understanding is aided by reference to Figure 3 in which one half cycle of A.-C. supply voltage impressed across one of the gate windings 3 or 4 is represented by curve 21 and the level of the counter-E. M. F. of the load is shown, at 22, to be transiently in excess of the voltage level 23 at which "firing" or saturation of the associated magnetic material takes place. That balance of the supply half-cycle during which a large current would normally be delivered to the load in absence of the counter-E. M. F. signal is designated by the cross-hatched portion 24. Under these transient conditions with the counter-E. M. F. larger than the supply voltage at the instant of "firing," no load current can be delivered. Gate winding exciting current does flow, however, during the interval when the supply voltage exceeds the counter-E. M. F. voltage and this current tends to prevent rapid decay of the counter-E. M. F. voltage. Also, if the control current is increased more negatively, to increase the reactor output in the manner shown in Figure 2, the counter-E. M. F. voltage will tend to be sustained further. A counter-E. M. F. at level 23 in Figure 3, or just below that level, will represent a steady-state condition under which accurate control is lost in this manner also.

In avoiding the aforesaid difficulties, we have found that the added circuit unit 25 in Figure 1, which we designate as part of an "auxiliary" load circuit, will cause this magnetic amplifier to function as though supplying a resistive rather than a counter-E. M. F. load. Accordingly, the characteristic is that of curve 14, in Figure 2, with instability, sluggish responses, and unpredictability of operation eliminated. Unit 25 includes a relatively high resistance 26 and a pair of rectifiers, 27 and 28, which are connected to gate windings 3 and 4 and polarized to deliver unidirectional pulses of current to resistance 26 during the same half cycles when rectifiers 11 and 12, respectively, seek to deliver current to the counter-E. M. F. load 10. Auxiliary resistance 26 is also connected to the transformer secondary center-tap 13, whereby the unit 25 is wholly paralleled with load 10 and its rectifiers 11 and 12.

As is well known, the control signal winding of a saturable reactance device cooperates with the gate windings thereof to produce the saturations which cause the desired conduction. And, by suitable adjustments of the control signal winding currents, the "firing" angles are adjusted to vary the amounts of power received by the load. However, in the systems wherein only a large counter-E. M. F. load is present, it has been found that the "firing" or saturating angles can also be a function of the counter-E. M. F., and the control signal circuit thus loses precise control. The aforementioned auxiliary load circuit overcomes this disadvantage by drawing through it the gate winding current components which are necessary to cause precision "firing" of the reactor core material in conjunction with the control signal winding circuitry, despite blocking effects of the counter-E M. F. load. For example, in Figure 1, the counter-E. M. F. load 10 alone may offer a voltage bucking the voltages appearing in the saturable reactor and opposing the flow of the gate winding current component which flows in each of gate windings 3 and 4 before saturation, whereby the changes in flux density in cores 1 and 2 which should be caused responsive to the A.-C. outputs of transformer 9 will not be of a fixed nature under all operating conditions of the system and the "firing" angles will shift intolerably. This effect is absent with the auxiliary load circuit 25 functioning, because it continues to draw the gate winding current component which must flow in the gate windings 3 and 4 before saturation, and the reactor "firing" is then controlled entirely by the control signal winding circuit. For this to occur, it is necessary that auxiliary load resistance 26 be small enough to draw this gate current component, which will be the case when the product of the auxiliary load resistance and this gate winding current component is less than the A.-C. supply voltage applied to each gate winding. Within this limit, the auxiliary load resistance may yet be many times the value of the primary load impedance, for example, twenty to fifty times as large, such that it will dissipate insignificant quantities of power. A further important feature of the operation of the auxiliary load circuit is that it will draw output current during those intervals when the reactor core material is saturated, whereby the capacitive element 17 of load 10 may quickly dissipate its counter-E. M. F. signals which happen to be larger than the reactor output voltage at any time. Such dissipation may occur through its associated parallel resistive component 18 and will take place rapidly, continuing until the primary load voltage assumes a value equal to that called for by the signal in the control signal winding circuit.

Our teachings are also applicable to three-phase amplistat systems, such as that portrayed in Figure 4. Three-phase excitation applied to A.-C. supply terminals 29 is applied to the six gate windings 30, 31, 32, 33, 34, and 35 in a known manner, each gate winding being associated with core material saturable under influence of the control signal winding means 36 which is excited at terminals 37 by appropriate unidirectional signals. Amplistat gain and unidirectional output are realized through operation of the properly polarized rectifiers 38 through 43, and the load 44 is of a type developing a large counter-E. M. F., with a large capacitance 45 and shunting resistive component 46 being illustrated. The circuitry thus far described seeks to operate in a known manner, except that the large counter-E. M. F. load 44 introduces those difficulties already discussed with reference to the embodiment of Figure 1. Accordingly, an auxiliary load circuit 47 is employed, with an auxiliary impedance 48 of a predominantly resistive character serving the purposes reviewed earlier herein. The six rectifiers 49 through 54 are connected intermediate the auxiliary load impedance 48 and each of the gate windings, whereby the needed gate winding current components will flow through the load to preserve accurate control by the control signal winding means 36.

Figure 5 depicts half-wave circuitry in which these teachings may be expressed. A.-C. source 55 there is coupled across a large counter-E. M. F. load 56 through a series rectifier 57 and the gate winding 58 of a saturable reactance device 59. The D.-C. control signal winding 60, which is adjustably excited by a source 61 through an adjustable impedance 62 seeks to exercise an output control to the primary load 56 which is opposed in a fashion referred to earlier by effects of the large counter-E. M. F. In this embodiment, the auxiliary load circuit, 63, including resistance 64 and rectifier 65, is also paralleled with the primary load, 56, and conducts current during the same half cycles when the primary load circuit tends to conduct. A relatively high impedance to A.-C. signals, impedance 66, is included serially within the control signal circuit to prevent the control winding and gate winding from functioning as short circuits and losing control in this half-wave system.

A preferred embodiment shown in Figure 6 is that wherein the large counter-E. M. F. load comprises the armature 67 of a D.-C. shunt motor, this being controlled in single-phase bridge amplistat circuitry. The main amplistat unit is of a conventional construction, including an A.-C. source 68 exciting the load through gate windings 69 and 70 and bridge rectifiers 71 through 74. Control winding 75 regulates the output to armature 67 under influence of the variable D.-C. supply which may include a D.-C. source 76 and adjustable impedance 77. Speed may be controlled, for example, through associated equipment adjusting the control signal circuitry. In this instance, the auxiliary load circuitry 78 correcting the aforementioned type of operating defects includes an auxiliary load resistance 79 which is connected in an auxiliary bridge rectifier arrangement with auxiliary rectifiers 80 through 83. The primary load and auxiliary load circuitries are thus fully in parallel. In speed control measurements with this system, the motor speed has been found to decay rapidly, at about the same rate as with the motor armature supply terminals open, thereby demonstrating that the interference effects tending to delay speed decay, without the auxiliary circuitry, had been suppressed effectively with the auxiliary circuitry functioning.

While particular embodiments of this invention have been shown and described, it will occur to those skilled in the art that various changes and modifications can be effected without departure from this invention, and therefore, it is aimed in the appended claims to cover all such changes and modifications as fall within the true spirit and scope of the invention.

What we claim as new and desire to secure by Letters Patent of the United States is:

1. Magnetic amplifier apparatus comprising at least one saturable core member, a gate winding and a control winding disposed in inductive relationship with said core member, a source of unidirectional control current energizing said control winding, a primary load developing varying counter electromotive forces responsive to electrical excitations thereof, first rectifier means, a source of periodically varying current coupled with said load through said gate winding and through said rectifier means, said rectifier means being polarized to deliver unidirectional signals to said load, an auxiliary load having a resistance value high in relation to the impedance of said primary load, second rectifier means, and means coupling said source of periodically varying current with said auxiliary winding through said gate winding and said second rectifier means whereby said primary load and first rectifier means are in parallel circuit relationship with said auxiliary load and said second rectifier means, said periodically varying current source and said resistance value of said auxiliary load being proportioned such that the gate winding exciting current component flowing through said gate winding before occurrence of saturation in said core member may flow through said auxiliary load.

2. Magnetic amplifier apparatus comprising at least one saturable core member, a gate winding and a control winding disposed in inductive relationship with said core member, a source of unidirectional control current energizing said control winding, a source of periodically varying current, a pair of parallel load circuits, one of said load circuits including a primary load which develops varying counter electromotive forces coupled with first rectifier means conducting current in but one direction through said primary load, the other of said parallel load circuits including an auxiliary load having a resistance value high in relation to the impedance of said primary load coupled with second rectifier means conducting current in said one direction through said auxiliary load, and means coupling said parallel load circuits with said periodically varying current source through said gate winding, said other of said load circuits being proportioned in relation to said alternating current source such that the gate winding exciting current component required to flow through said gate winding before saturation occurs in said core member may flow through said other of said load circuits.

3. Magnetic amplifier apparatus comprising a plurality of gate windings disposed in inductive relationship with saturable magnetic core material, a source of alternating current, a primary load developing large counter electromotive forces responsive to electrical excitation thereof, first rectifier means, means coupling said source with said load through said gate windings and through said rectifier means, said rectifier means being polarized to conduct current unidirectionally through said load, an auxiliary load having a resistance value high in relation to the impedance of said primary load, second rectifier means, means coupling said source with said auxiliary load through said gate windings and through said second rectifier means, said second rectifier means being polarized to conduct current unidirectionally through said auxiliary load and in the same directions through said gate windings as the currents caused to flow through said gate windings by said first rectifier means and said primary load, and control circuit means regulating the flow of currents through said gate windings.

4. Magnetic amplifier apparatus comprising a saturable reactance device having a plurality of gate windings disposed in inductive relationship with saturable magnetic material and control circuit means for regulating the flow of currents through said gate windings by controlling the saturations of said material, a primary load including a large capacitive component in parallel with a resistive component, whereby said primary load develops large counter electromotive forces responsive to electrical excitation thereof, first rectifier means, an auxiliary load having a resistance value high in relation to that of said primary load, second rectifier means, a source of alternating current excitation, means coupling said source with said primary load through said gate windings and through said first rectifier means, and means coupling said source with said auxiliary load through said gate windings and through said second rectifier means, said first and second rectifier means being polarized to conduct currents in the same direction through said gate windings to said primary and auxiliary loads, respectively.

5. Magnetic amplifier apparatus comprising a saturable resistance device having a plurality of gate windings disposed in inductive relationship with saturable magnetic material and having control circuit means excited by unidirectional currents for regulating the flow of currents through said gate windings by controlling the saturations of said material, a D.-C. motor winding which develops large counter electromotive forces, first rectifier means, an auxiliary load having a resistance value high in relation to that of said motor winding, second rectifier means, a source of alternating current excitation, means coupling said source with said motor winding through said gate windings and through said first rectifier means, and means coupling said source with said auxiliary load through said gate windings and through said second rectifier means, said first and second rectifier means being polarized to conduct currents in the same direction through said gate windings to said motor winding and auxiliary load, respectively.

References Cited in the file of this patent
UNITED STATES PATENTS
2,733,307    Ogle  ---------------- Jan. 31, 1956